L. X. CHAMPEAU.
ILLUMINATING MEANS.
APPLICATION FILED APR. 18, 1919.
1,350,295.
Patented Aug. 24, 1920.
3 SHEETS—SHEET 2.
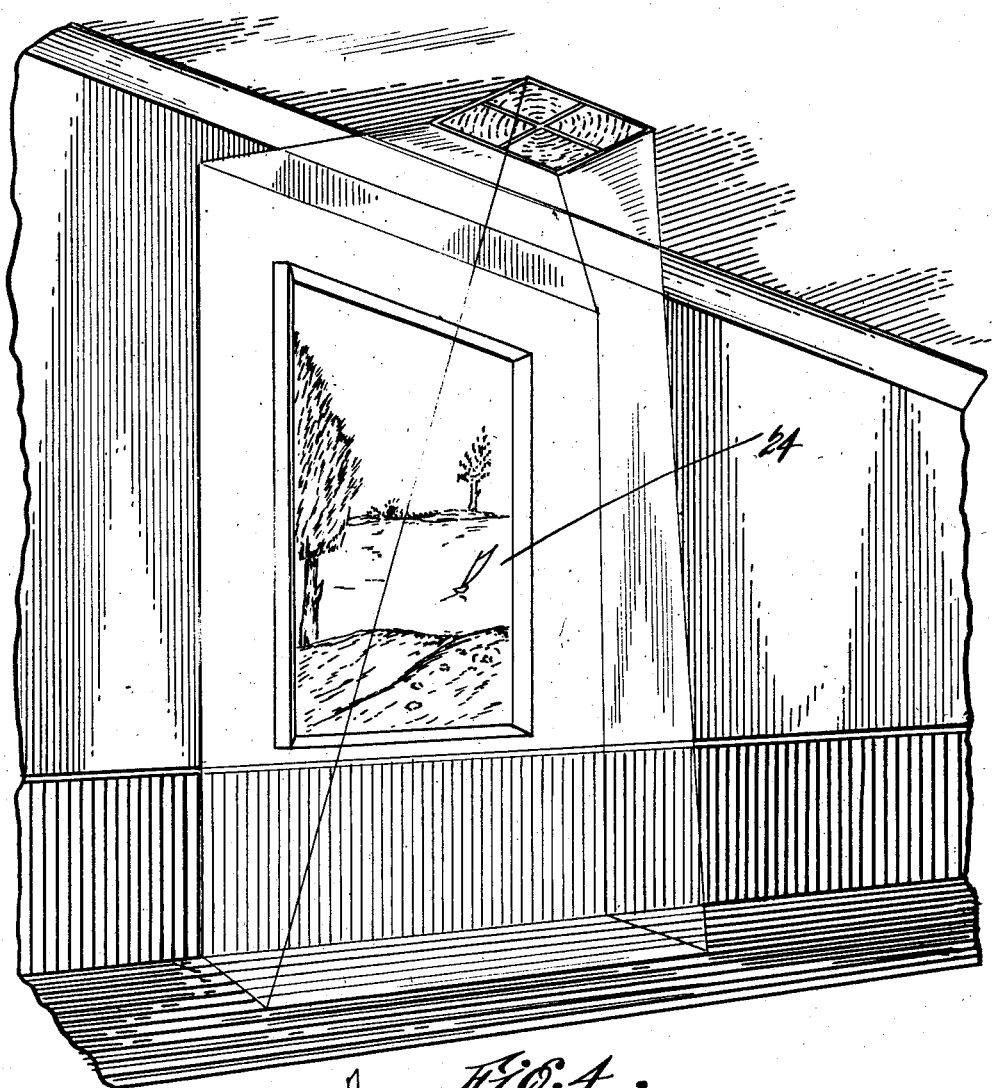
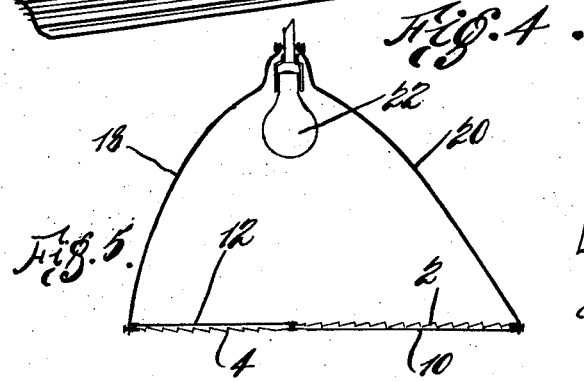
INVENTOR
Lawrence X. Champeau
BY
ATTORNEY

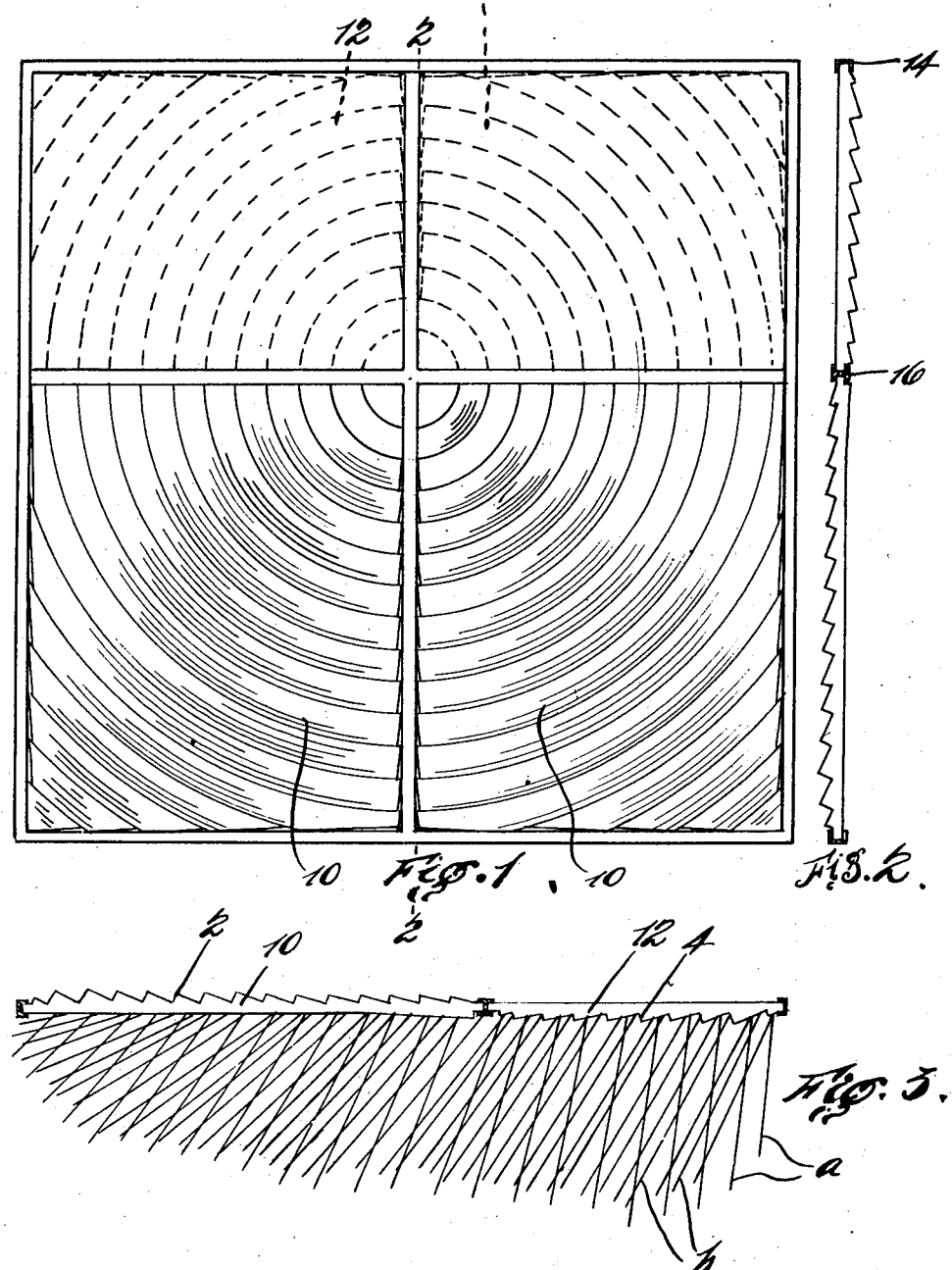

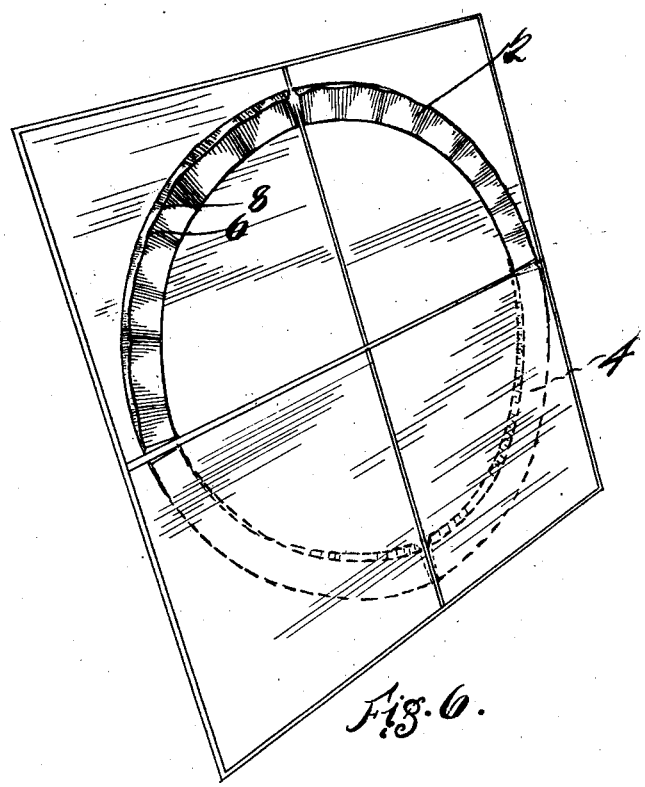

200
UNITED STATES PATENT OFFICE.

LAWRENCE X. CHAMPEAU, OF JERSEY CITY, NEW JERSEY, ASSIGNOR TO KIRBY, CHAMPEAU CO., INC., OF NEW YORK, N. Y., A CORPORATION OF NEW YORK.

ILLUMINATING MEANS.

1,350,295.

Specification of Letters Patent.   Patented Aug. 24, 1920.

Application filed April 18, 1919.   Serial No. 290,938.

*To all whom it may concern:*

Be it known that I, LAWRENCE X. CHAMPEAU, a citizen of the United States, residing at Jersey City, New Jersey, have invented certain new and useful Improvements in Illuminating Means, of which the following is a clear, full, and exact description.

This invention relates to illuminating means and particularly to illuminating means which are adapted to be associated with an artificial source of illumination to direct and to distribute the light from such a source to produce a desired illuminating effect.

A general object of the invention is to provide means for effecting a substantially even distribution of light from an artificial source of illumination over a surface obliquely offset from said source.

In the lighting of art galleries and other rooms where it is especially desirable that the side walls or particular objects upon the side walls be well lighted, difficulty has been experienced in so locating artificial illuminating means as to obtain proper illumination of the walls at night without interference with proper illumination by daylight and without marring the general appearance of the rooms. In many art galleries it is the practice at the present time to illuminate paintings hung upon the side walls by means of lights located above and slightly in front of the paintings, these lights being provided with reflectors to direct the light upon the paintings and to prevent direct rays from striking the eyes of the observer.

The principal defects in the mode of illumination just described are that the upper part of the painting is illuminated much more brightly than the lower part, and the light is too nearly unidirectional, thereby causing marked shadows below any roughnesses, dust or other excrescences upon the paintings, and altogether causing the picture to produce an effect upon the observer quite different from that intended by the artist and usually quite different from that produced by the same picture when illuminated by daylight.

A particular object of the present invention is to provide a lens for use with an artificial source of illumination which will so deflect the rays of light emanating from said source as to produce a substantially even distribution of the light over an object to be illuminated that is obliquely offset with respect to said source of light, and which, furthermore, will so deflect the light as to cause each part of the object to be illuminated by rays coming from different directions, thus avoiding the formation of intense shadows. The invention also aims to provide a lens so constructed that it tends to throw a large proportion of the light to one side of the axis of the lens in which the source of artificial illumination is located.

Other objects and novel and important features of the invention will appear from the following description and claims when considered in connection with the accompanying drawings, in which—

Figure 1 is a front elevation of a lens having therein the novel features of lens construction of the present invention;

Fig. 2 is a section on the line 2—2 of Fig. 1;

Fig. 3 is a view illustrating the various directions of travel of the light rays by which the illuminating effect of the lens is produced;

Fig. 4 is a perspective view illustrating one of the uses of the lens and the light effect produced when the lens is thus used;

Fig. 5 is a diagrammatic section through an illuminating device embodying the present invention, this view illustrating particularly the sectional contour of a reflector which may be associated with the lens; and Fig. 6 is a perspective view illustrating the contour and arrangement of the prisms upon opposite sides of the lens axis, a single prism only being shown upon each side.

The illuminating means herein illustrated preferably comprises a lens of the general construction of that shown in Figs. 1, 2 and 3 and a reflector of the general cross sectional contour of that illustrated in Fig. 5, the lens and reflector being associated with a light obliquely offset from the surface or object particularly to be illuminated, as shown, for example, in Fig. 4, in which the light is located in the ceiling above a painting on the side wall which is to be illuminated by said light.

It will be seen that with a location of the light and object to be illuminated such as shown in Fig. 4, it is important that means be provided for directing as much of the light as possible upon the object, for distributing the light as evenly as possible over the object and for so diffusing or changing the direction of the rays of light as to avoid the formation of sharp shadows. The principal means of the present invention for accomplishing the foregoing desired ends is the lens structure shown particularly in Figs. 1, 2 and 3 of the drawings. This lens, which may be of rectangular outline, as shown in Fig. 1, or of any other suitable or desired outline, is formed of a plurality of prisms curved about the lens axis in which the source of artificial illumination is to be located, the prisms 2 upon that side of the lens nearer the object or wall to be illuminated tapering toward the lens axis and the prisms 4 upon that side of the lens axis remote from the wall or object to be illuminated tapering away from the lens axis. The purpose of this difference in the tapering of the two sets of prisms will be apparent when Fig. 3 of the drawings is examined, this figure showing, upon the left side, that part of the lens which is nearer to the wall to be illuminated, and having the prisms tapering toward the lens axis, and showing upon the right the part of the lens remote from the wall to be illuminated and which has its prisms tapering away from the lens axis.

In order to effect the proper distribution of the light, the respective sets of prisms are preferably graduated from the axis outward, each set having its greatest base thickness or its greatest apex angle in that prism most remote from the lens axis, and being graduated downward to the smallest base thickness and the smallest apex angle in that prism which is nearest the lens axis. These prisms, as shown in Figs. 2, 3 and 6, are preferably formed as prismatic ridges upon an integral plate, one side of the plate being preferably plane and the plane side being preferably nearer the source of illumination with respect to the prisms 4, and being remote from the source of illumination with respect to the prisms 2. Moreover, as shown in Fig. 6, each of the prismatic ridges is preferably formed with its sides at varying inclinations to each other at different points along the ridge so that each ridge presents high and low spots 6 and 8, as clearly shown in this figure, whereby a greater spreading of the light takes place, as brought out more fully in my co-pending application Serial No. 290,937 of even date herewith. Fig. 6 also illustrates the location of the prisms 2 upon one side of the lens structure as a whole and the prisms 4 upon the other side.

For convenience of manufacturing, handling and mounting of the lenses, which are preferably made in comparatively large sizes to produce the desired light distribution, the lens may be formed in sections, as shown in Fig. 1, in which the lens is made up of four rectangular sections, the sections 10 being those adapted to be located nearer the wall or object to be illuminated, and being preferably somewhat larger than the sections 12 which are intended to be located upon the side of the lens axis remote from the object to be illuminated. These sections, as in the case of the lens described in my co-pending application hereinabove identified, may be mounted in a framework comprising outside channel bars 14 and crossed I bars 16 which receive margins of these sections shaped to fit the channels in the respective frame members.

In Fig. 5 is illustrated a reflector adapted to be employed with a lens of the construction particularly described hereinabove, this reflector having one side 18 shaped to coöperate particularly with the sections 12 carrying the prisms 4 upon the side of the axis of the lens remote from the wall or object to be illuminated, and having a somewhat differently curved side 20 shaped to coöperate with the sections 10 having the prisms 2 upon that side of the lens adapted to be located nearer the wall or object to be illuminated. The artificial source of illumination may be an incandescent light 22 such as shown in Fig. 5, or any other suitable source of artificial light properly located with respect to the lens and reflector.

The graduation of the prisms, the relative sizes of the sections 10 and 12, and the shaping of the reflector sides 18 and 20 are preferably such that, as shown in Fig. 3 of the drawings, a substantially uniform amount of light will be thrown upon the side wall or upon that part of it which it is intended to illuminate, and that some of the rays effecting this illumination will come from one direction and other rays from other directions, thus eliminating shadows which might be caused by inequalities in the surface, etc.

The range of illumination of illuminating means such as hereinabove described is illustrated in Fig. 4 of the drawings, in which the lens is located in the ceiling and is associated with a reflector and lamp of the general contour and arrangement shown in Fig. 5, except that the structure shown in Fig. 5 will naturally be reversed to bring the side 20 nearer the wall upon which the painting 24 to be illuminated is located. Not only does the lens hereinabove described effect an even distribution of the light upon the painting 24, which is obliquely offset from the source of illumination, but, as shown in this figure, it prevents direct rays from the source of illumination from striking the eye of the observer, and thus prevents any interference with his view of the picture. Moreover, it will be noted that the illuminating means of this invention permits of inconspicuous arrangement of the source of artificial illumination, whereby it does not interfere with daylight illumination and at the same time is of such a form that it lends itself readily to architectural adaptation.

In Fig. 3 of the drawings, in which the spread of the light is illustrated and in which is also illustrated the fact that rays coming from different directions strike each part of the surface to be illuminated, the rays *a* are those from the low spots 8 of the respective ridges, and the rays *b* are those from the high spots of the respective ridges.

What I claim as new is:

1. A lens adapted to be associated with an artificial source of illumination, said lens having an axis in which the light source is to be substantially located and having upon one side of a diametrical line through said axis a series of prisms each tapering toward said axis along any radius from said axis through said prisms and having upon the opposite side of said axis line and upon the opposite face of said lens a series of prisms each tapering away from said axis along any radius from said axis through said prisms.

2. A lens adapted to be associated with an artificial source of illumination, said lens having an axis in which the light source is to be substantially located and having upon one side of said axis a series of substantially coaxial prisms each tapering toward said axis and having upon the opposite side of said axis a series of substantially coaxial prisms each tapering away from said axis, said two series of prisms being correspondingly graduated in refracting power from the axis outward.

3. A lens adapted to be associated with an artificial source of illumination, said lens having an axis in which the light source is to be substantially located and having upon one side of said axis a series of substantially coaxial prisms each tapering toward said axis and having upon the opposite side of said axis a series of substantially coaxial prisms each tapering away from said axis, the prisms of each series increasing in refracting power from the axis outward.

4. A lens adapted to be associated with an artificial source of illumination, said lens having an axis in which the light source is to be substantially located and having upon one side of said axis a series of substantially coaxial prisms each tapering toward said axis and having upon the opposite side of said axis a series of substantially coaxial prisms each tapering away from said axis, said series of prisms being graduated in like senses from the axis outward and said lens having a greater part of its area upon the first mentioned side of said axis.

5. A lens adapted to be associated with an artificial source of illumination, said lens having an axis in which the light source is to be substantially located and having upon one side of said axis, a series of prisms curved about said axis and each tapering toward said axis and having upon the opposite side of said axis and upon the opposite face of said lens another series of prisms curved about said axis and each tapering away from said axis.

6. A lens adapted to be associated with an artificial source of illumination, said lens having an axis in which the light source is to be substantially located and having upon one side of said axis a series of prisms each tapering toward said axis and having upon the opposite side of said axis and upon the opposite face of said lens a series of prisms each tapering away from said axis, the respective prisms having a varying inclination of their refracting faces at different points along said prisms.

7. In an illuminating device, a lens adapted to be associated with an artificial source of illumination for illuminating a surface obliquely offset from said source, said lens having an axis in which the light source is to be substantially located and having upon that side of the axis adjacent to the surface to be illuminated a series of prisms curved about said axis and each tapering toward said axis and having upon the side of said axis remote from said object a series of prisms curved about said axis and each tapering away from said axis, each series of prisms increasing in refracting power from the axis outward, and a reflector associated with said lens and said source of artificial illumination.

8. In an illuminating device adapted to be used with a source of artificial illumination, a lens adapted to direct light from said source upon a surface obliquely offset from said source, said lens having an axis in which said light source is substantially to be located and having upon its inner face and upon the side of said axis adjacent to the surface to be illuminated a series of prisms curved about said axis and each tapering toward said axis and having upon its outer face and upon the side of said axis remote from said surface a series of prisms curved about said axis and each tapering away from said axis, said lens having a greater part of its area upon the first mentioned side of said axis, and a reflector between which and said lens said source of illumination is to be confined, said reflector likewise having its axis in the lens axis and having a greater part of its reflecting surface upon the side of said axis adjacent to said surface to be illuminated.

9. A lens adapted to be associated with a source of artificial illumination for illuminating a surface obliquely offset from said source, said lens having upon one side of an axis, in which said source of illumination is to be located, a series of prismatic ridges curved about said axis, increasing in refracting power from the axis outward and each tapering toward said axis and having upon the other side of said axis a series of prismatic ridges curved about said axis, increasing in refracting power from the axis outward and each tapering away from said axis, the face of said lens remote from said light source upon the first mentioned side of said lens axis being plane, and the face of said lens nearer said light source upon the opposite side of said lens axis being plane.

Signed at New York city, N. Y., this 7th day of April, 1919.

LAWRENCE X. CHAMPEAU.